Feb. 10, 1959     J. E. BYWATER     2,873,125
LINKAGE MECHANISM FOR THE ATTACHMENT OF MOUNTED
IMPLEMENTS TO TRACTORS AND THE LIKE
Filed April 23, 1956     3 Sheets-Sheet 2
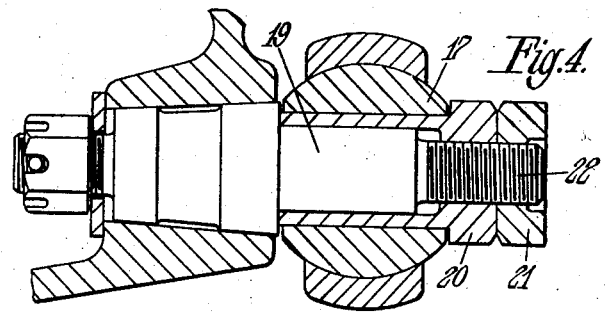
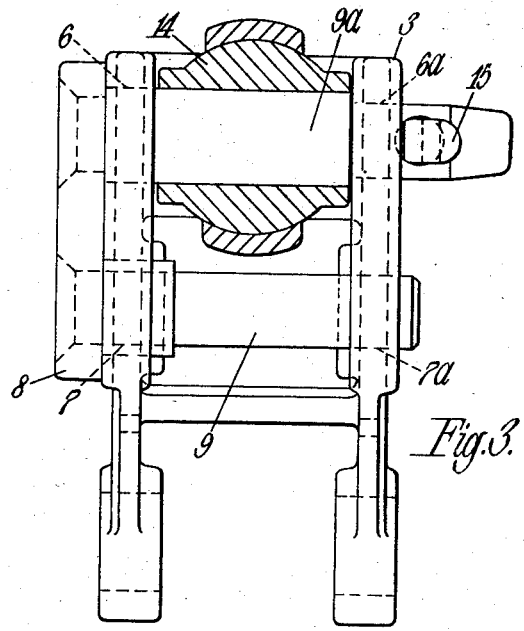
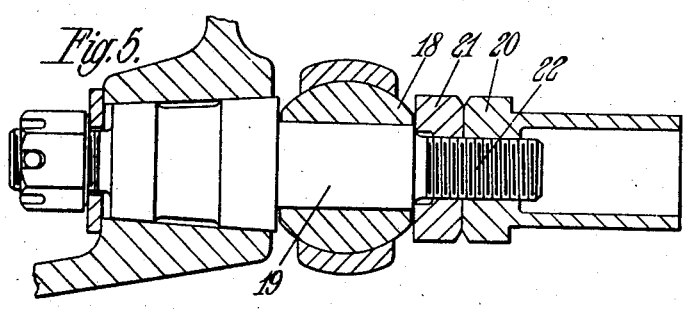
Inventor
J. E. Bywater

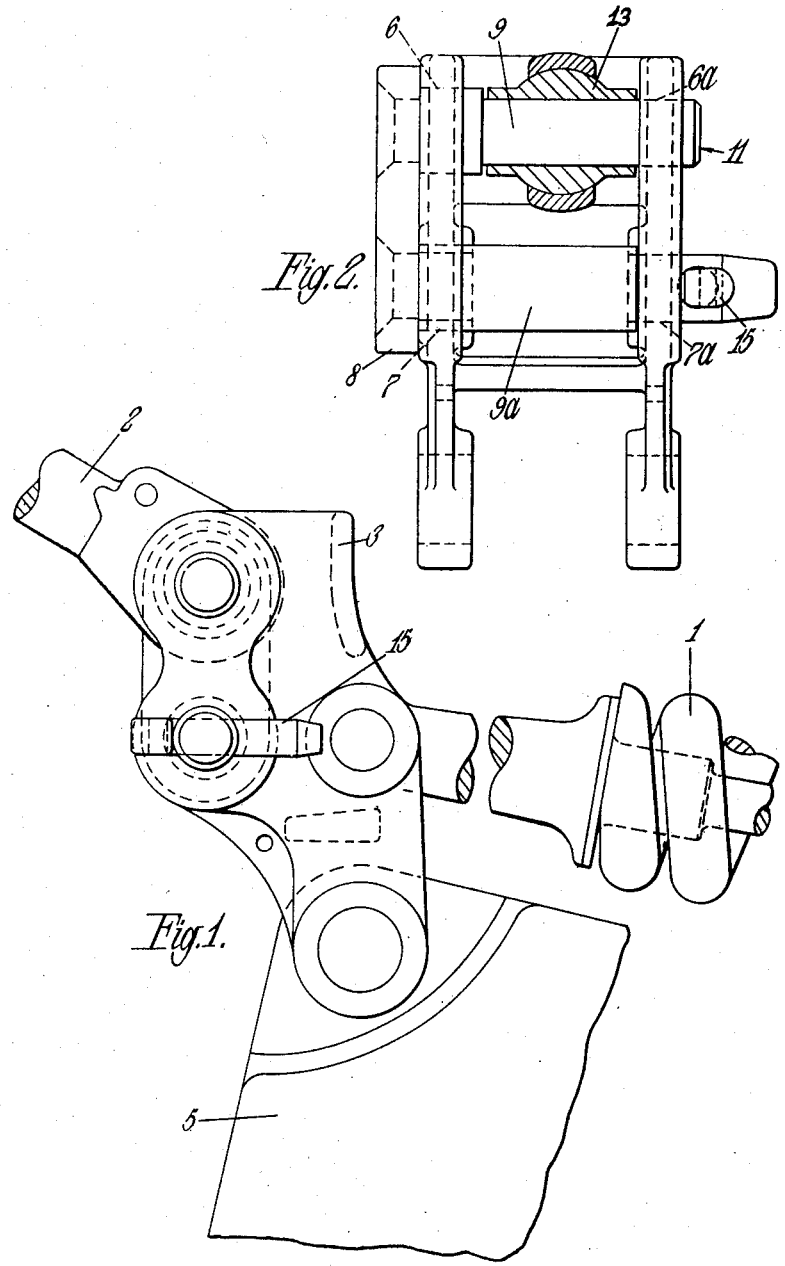

2,873,125
Patented Feb. 10, 1959

2,873,125

LINKAGE MECHANISM FOR THE ATTACHMENT OF MOUNTED IMPLEMENTS TO TRACTORS AND THE LIKE

James Edward Bywater, Barking, England, assignor to Ford Motor Company Limited, London, England Application April 23, 1956, Serial No. 579,974

Claims priority, application Great Britain April 25, 1955

7 Claims. (Cl. 280—461)

This invention relates to linkage mechanism for the attachment of mounted implements to tractors and is particularly applicable to the so-called three point linkage mechanism by means of which the implement is attached to the tractor by three links which are usually pivoted to the tractor and controlled by hydraulic means.

In mechanisms of this character, the linkages are usually made in different sizes to suit different tractors, and as a result difficulties have occurred in fitting implements designed for one size or category of linkage to a tractor provided with a linkage of different size or category.

The invention accordingly has for its main object to overcome this difficulty and the invention accordingly consists of a linkage mechanism wherein one end of each link is provided with a ball or other joint of one size whilst the other end of each link is provided with a ball or other joint of a different size, either of which may be used alternatively as a pivotal connection whereby the linkage may be converted from one category to another according to the size or type of the implement to be mounted.

According to a preferred arrangement, the linkage balls at the end of a link are mounted on the arms of a U-shaped member adapted to accommodate balls corresponding to two linkage categories, and means may be provided for reversing the position of such U-shaped member whereby a linkage ball of either category may be used as required.

The invention will be further described in an embodiment with reference to the accompanying drawings, wherein:

Figure 1 is a side elevation of a portion of a tractor showing an upper link pivot of a three-point linkage.

Figure 2 is a rear elevation of the device shown in Figure 1.

Figure 3 is similar to Figure 2 but shows a ball of another category in position.

Figures 4 and 5 show a lower link pivot of a three point linkage with balls of two categories in position therein.

Figure 6:
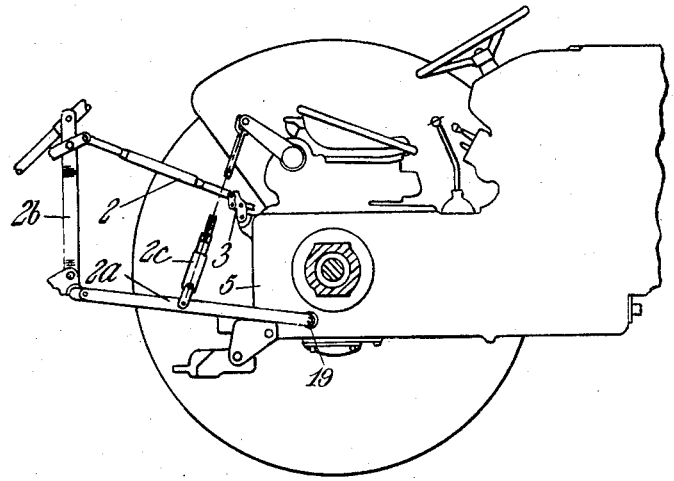
Figures 6 and 7 are respectively a side elevation of the rear portion of a tractor with one wheel omitted for clarity, and a rear elevation thereof to show the general layout of the three-point linkage.
Figure 7:
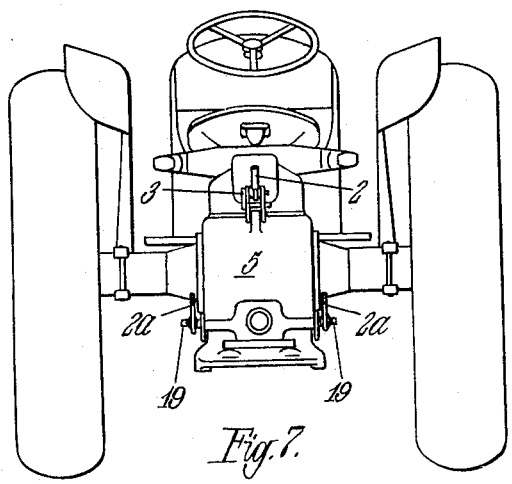

Referring first to Figures 6 and 7 an upper link 2 is mounted on the rear transmission housing 5 of the tractor by means of a U-shaped bracket 3 to be described in more detail hereinafter. A pair of lower links 2a are mounted on the lower part of the rear transmission housing 5 by means of pins 19 to be described more in detail with reference to Figures 4 and 5.

The links 2 and 2a form a three-point linkage to support an A frame 2b for an implement, not illustrated. The implement is adapted to be lifted and lowered by power lift links 2c acting on lower links 2a.

Referring now to Figures 1 to 3, the top link 2 is pivotally mounted in a U-shaped bracket 3 which may itself be pivotally mounted on the rear transmission housing of the tractor or which may be an integral part of the rear transmission housing 5 and to which is attached one end of a spring 1 for controlling the draft of the implement to be fitted, the spring 1 being adapted to act in opposition to the compressive working force acting on the top link 2 when the implement is in operation.

For the purpose of pivotally mounting the top link 2 in the bracket 3, two holes 6 and 7 are provided in one of the arms of the bracket of a suitable diameter for mounting a linkage ball of one standard size or category and holes 6a and 7a are also provided in the other arm of the bracket opposite the first mentioned holes but of a diameter for mounting a linkage ball of a different and smaller size or category. Into these holes is passed a U-shaped bolt 8, the arms of which have different diameters for accommodating the two sizes of linkage balls. Thus one of these arms 9a has a diameter equivalent to that of the large holes 6 and 7 for the full internal width of the clevis between the two arms of the bracket 3, and terminates in an end part of smaller diameter where it passes through the small hole (7a in Figure 2, 6a in Figure 3), while the other arm 9 has a large diameter only over a sufficient part of its length as to provide an abutment face to give the correct width clevis to accommodate the smaller linkage ball 13 (as shown in Figure 2), the remainder of the pin being of small diameter.

This U-shaped bolt 8 is detachably mounted so that it may be readily detached and inverted in position thus allowing either sized linkage ball to be accommodated on the same centre line or pivotal axis, a linchpin 15 or other device being provided for holding the ball in position when assembled. Figure 3 shows a larger category linkage ball 14 in position.

In the case of the lower links, the mounting for the two categories of linkage balls at the end of each link may comprise a pin having a detachable sleeve member so that two different sizes of balls may be accommodated as desired. Thus, in Figures 4 and 5 the lower part of the transmission housing of the tractor may be provided with a projecting pin 19 of such diameter as to accommodate the smaller size of linkage ball 18, the pin terminating in a screw-threaded end part 22 of smaller diameter on which may be mounted a suitable lock nut 21 for securing the ball in position. In order that a linkage ball 17 of large size may be accommodated, however, a detachable sleeve member 20 is provided which may be screwed on to the end part 22 after removing the lock nut 21 so that the sleeve member 20 completely surrounds the pin 19 thus enlarging its diameter sufficiently to provide a mounting for the larger size of linkage ball 17. If desired, this sleeve member may be screwed on to the end part of the pin in the reverse position when it is not required for use.

It is to be understood, however, that the invention is not to be regarded as being limited to the particular constructional arrangement hereinbefore described which may be readily modified to suit individual requirements, and that if desired the constructions described in connection with the top link may be used for the bottom links and vice versa.

It is also to be understood that the method of mounting the linkage balls may be employed at either or both ends of the links and that in the case where two different mounting positions are provided as described in connection with the top link, either position may be used for mounting the linkage ball so that in cases where a draft control system is provided, the optimum mounting position may be used to ensure the maximum control on the load passed to the draft control spring due to the compressive working force developed on the top link.

What we claim is:

1. In a tractor, a link pivot arranged to accommodate in a working position a ball of a link forming part of a linkage mechanism for the attachment of a mounted implement, such link pivot having first and second portions of dimensions to accommodate respectively first and second sizes of ball, said first and second portions being adapted to be located selectively in said working position, whereby a ball of either said first size or said second size may be accommodated on said tractor by said link pivot.

2. In a tractor, a link pivot arranged to accommodate in a working position a ball of a link forming part of a linkage mechanism for the attachment of a mounted implement, such link pivot comprising a U-shaped bracket having a plurality of pairs of aligned apertures in the arms thereof, and a U-shaped pin member having arms adapted to extend across the U-shaped bracket between pairs of aligned apertures to form therewith a clevis defining a working position corresponding with each pair of apertures, the arms of said U-shaped pin member being of such dimensions as to accommodate respectively first and second sizes of ball, the U-shaped pin member being reversible in the bracket whereby a ball of either said first size or said second size may be accommodated in any of the plurality of working positions defined by said plurality of pairs of aligned apertures.

3. The structure defined by claim 2 which is further characterised in that the U-shaped bracket has two pairs of aligned apertures, whereby two working positions are provided for the accommodation of the ball.

4. The structure defined by claim 3 which is further characterised in that the link pivot forms the upper link pivot of a three-point linkage arrangement.

5. In a tractor, a link pivot arranged to accommodate in a working position a ball of a link forming part of a linkage mechanism for the attachment of a mounted implement, such link pivot comprising a pin of a dimension to accomodate a ball of a first size, and a sleeve member adapted to fit over said pin and to be threadedly secured thereover, the outer diameter of said sleeve member being such as to accommodate a ball of a second size, whereby a ball of either said first size or said second size may be selectively accommodated in working position on said pin.

6. The structure as defined by claim 5 which is further characterised in that said link pivot is positioned so as to form one lower link pivot of a three-point linkage arrangement, and a second similar link pivot is also provided and positioned so as to form the other lower link pivot in the arrangement.

7. In a tractor, a link pivot arranged to accommodate in a working position a ball of a link forming part of a linkage mechanism for the attachment of a mounted implement, such link pivot comprising a pin of a dimension to accommodate a ball of a first size, and a sleeve member adapted to fit over said pin, the outer diameter of said sleeve member being such as to accommodate a ball of a second size, whereby a ball of either said first size or said second size may be selectively accommodated in working position on said pin.

No references cited.